Sept. 8, 1925.
E. A. LEHMANN
1,553,087
LIGHTNING PROTECTION FOR AIRCRAFT
Filed March 25, 1924
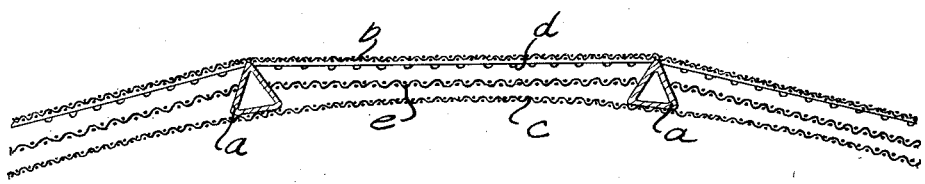
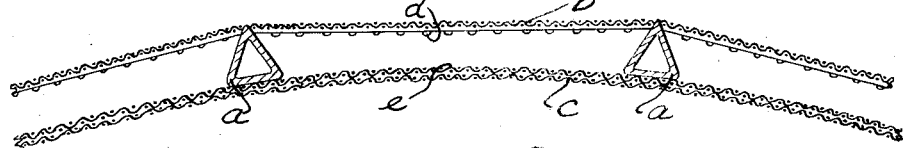
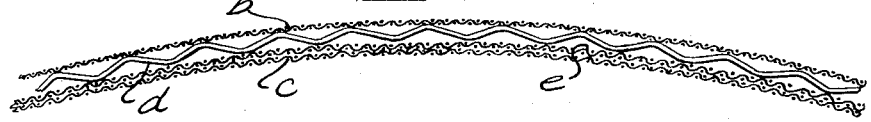
INVENTOR
Ernst A. Lehmann
BY
ATTORNEYS Patented Sept. 8, 1925.

1,553,087

UNITED STATES PATENT OFFICE.

ERNST A. LEHMANN, OF AKRON, OHIO, ASSIGNOR TO LUFTSCHIFFBAU ZEPPELIN GESELLSCHAFT MIT BESCHRANKTER HAFTUNG, OF FRIEDRICHSHAFEN, GERMANY.

LIGHTNING PROTECTION FOR AIRCRAFT.

Application filed March 25, 1924. Serial No. 701,735.

*To all whom it may concern:*

Be it known that I, ERNST A. LEHMANN, a citizen of Germany, residing temporarily in Akron, county of Summit, State of Ohio, have invented certain new and useful Improvements in Lightning Protections for Aircraft, for which I have filed an application for German Letters Patent March 31, 1923, and of which the following is a specification.

My invention relates to means for protecting aircraft employing a lifting gas against fire or damage caused by lightning. I will describe a means for this purpose embodying my invention, and then point out the novel features thereof in claims.

In the accompanying drawing, Fig. 1 is a detail vertical sectional view of a portion of a rigid airship embodying one form of my invention. Fig. 2 is a similar view but showing another form of my invention. Fig. 3 is a view similar to Figs. 1 and 2 but of a non-rigid ship, for example, a balloon, and embodying my invention.

My invention in its broadest aspect may be said to involve in the outer cover or envelope of the aircraft some form of metal having a sufficient area to constitute a conductor for lightning, and which conductor is located at that portion of the aircraft containing the lifting gas cells or bags, and the provision of non-inflammable material whereby in the event of lightning striking the conductor the molten metal therefrom is prevented from reaching the gas cells or bags and thereby damaging them, and from preventing ignition of the lifting gas (should it be inflammable) which might result in the possible destruction of the airship by fire. Preferably the metal lightning conductor will be separated from the wall of the gas cell or bag, and the non-inflammable material is located in this space. The non-inflammable material may be separated from the wall of the gas cell or bag or it may be on the wall of the gas cell or bag, or it may form the wall of the gas cell or bag, or it may assume the form of a chemical with which the gas cell or bag is impregnated to make it non-inflammable.

Referring now to Fig. 1, $a$ designates the longitudinal girders or trusses of a rigid airship. $b$ designates the outer cover or envelope of the rigid airship which may be of any suitable material. $c$ designates a wall of one of the several gas cells or bags which are provided in the rigid airship for lifting it and keeping it afloat in the air. These are all well-known, as well as their arrangement, and need not be further described. $d$ designates a metal conductor constituting a conductor for lightning and which is preferably only employed in that part or parts of the rigid airship in which the gas cells or gas bags are located. As here shown, the metal conductor is in the form of a wire netting and as being secured to the longitudinal girders or trusses to thereby assist in the strengthening of the airship hull. If desired, the metal conductor $d$ may be a solid plate and it may constitute the envelope or outer cover for the airship. Instead the cover $b$ may be sufficiently metallized and thereby serve also as the conductor for lightning. I prefer, however, the wire netting (on account of its lighter weight) and to locate it beneath the usual cover or envelope $b$ as shown.

It will be observed from Fig. 1, that the longitudinal girders or trusses $a$ separate the conductor $d$ from the walls of the gas cells or bags $c$ so that jacket-space is provided between the two. In this space I locate the non-inflammable material which serves to prevent the molten metal of the conductor $d$ (in the event that it is struck by lightning) from reaching the wall of a gas cell or bag. If it did reach the wall of a cell or bag it would burn it, at least sufficiently to permit the escape of the lifting gas, and in the event that the lifting gas is inflammable it would ignite the gas which might result in the entire destruction of the airship by fire. The advantage or purpose of this jacket space which may be filled with air or other non-inflammable gas is that the molten metal has a chance to lower its temperature and thereby have less deleterious effect on the non-inflammable material. In Fig. 2 the non-inflammable material $e$ is shown as being on the wall of the gas cell or bag and in this form of the invention the non-inflammable material should be flexible in order that it may always and as nearly as possible conform to the flexing of the gas cell or bag produced by the changes in the quantity or pressure of the lifting gas; and furthermore it may be employed to transmit the pressure of the lifting gas to the framework of the airship.

Referring now to Fig. 3, the metallic conductor *d* may be used to cause a jacket space between the outer and inner cover, for example, it may be bent to form waves or ridges which act to separate the envelope or cover *b* from the non-inflammable material *e* provided for the protection of the gas cell or bag *c*.

The drawings illustrate only some of the ways my invention may be used in practice. Persons skilled in the art may see further possibilities so that I do not want to be limited to these examples.

What I claim is:

1. An airship shell comprising an outer cover; a conductor for lightning; an inner cover containing the lifting gas; a jacket space between said outer and said inner cover; and means for protecting said inner cover from the effect of lightning on said conductor.

2. An airship shell comprising an outer cover spread over a conductor for lightning; an inner cover containing the lifting gas; a jacket space between said outer and said inner cover; and means for protecting said inner cover from the effect of lightning on said conductor.

3. An airship shell comprising a conductor for lightning; an outer cover enclosing said conductor; an inner cover containing the lifting gas; a jacket space between said outer and said inner cover; and means for protecting said inner cover from the effect of lightning on said conductor.

4. An airship shell comprising an outer cover containing a conductor for lightning; an inner non-inflammable cover containing the lifting gas; and an air-jacket between both covers.

5. An airship shell comprising an outer cover; a metal conductor underneath; a gas cell; an air jacket between the outer and the inner cover; and a non-inflammable material for protecting the gas cell against the effects of lightning on the metal conductor.

6. An airship shell comprising an outer cover containing a conductor for lightning; an inner cover containing the lifting gas; a protecting non-inflammable cover on top of the latter; and an air-jacket between the outer and the inner cover.

7. An airship shell comprising an outer cover; a metal conductor of network underneath it; an inner cover containing the lifting gas; a protecting non-inflammable cover on top of the latter; and an air-jacket between the outer and the inner cover.

8. An airship shell comprising an outer cover containing a conductor for lightning; an inner cover containing the lifting gas; a protecting non-inflammable cover on top of the latter serving at the same time as means to counteract the inner gas pressure on the gas envelope, and an air space between the outer and the inner cover.

9. An airship shell comprising an outer cover; a metal cover or network underneath it; an inner cover containing the lifting gas; a protecting non-inflammable cover on top of the latter serving at the same time as means to counteract the inner gas pressure on the gas envelope; and an air space between the outer and the inner cover.

ERNST A. LEHMANN.